(12) United States Patent
Martignago et al.

(10) Patent No.: US 11,525,453 B2
(45) Date of Patent: Dec. 13, 2022

(54) BEARING ARRANGEMENT FOR A DRIVE SHAFT OF A TURBO-MACHINE, AND A TURBO-MACHINE INCLUDING SUCH A BEARING ARRANGEMENT

(71) Applicants: Robert Bosch GmbH, Stuttgart (DE); Danfoss Commercial Compressors, Trévoux (FR)

(72) Inventors: Clement Martignago, Miserieux (FR); Patrice Bonnefoi, Saint Didier au mont d'or (FR); Stan Vandesteene, Lyons (FR); Yves Rosson, Villars les Dombes (FR)

(73) Assignees: Robert Bosch GmbH, Stuttgart (DE); Danfoss Commercial Compressors, Trévoux (FR)

( * ) Notice: Subject to any disclaimer, the term of this patent is extended or adjusted under 35 U.S.C. 154(b) by 569 days.

(21) Appl. No.: 16/491,201

(22) PCT Filed: Mar. 8, 2018

(86) PCT No.: PCT/EP2018/055802
§ 371 (c)(1),
(2) Date: Sep. 5, 2019

(87) PCT Pub. No.: WO2018/162655
PCT Pub. Date: Sep. 13, 2018

(65) Prior Publication Data
US 2020/0011341 A1 Jan. 9, 2020

(30) Foreign Application Priority Data
Mar. 8, 2017 (FR) .......... 1751908

(51) Int. Cl.
F04D 29/056 (2006.01)
F01D 25/12 (2006.01)
(Continued)

(52) U.S. Cl.
CPC ......... F04D 29/056 (2013.01); F01D 25/125 (2013.01); F04D 29/057 (2013.01);
(Continued)

(58) Field of Classification Search
None
See application file for complete search history.

(56) References Cited

U.S. PATENT DOCUMENTS 2,697,645 A 12/1954 Mitchell
3,194,616 A * 7/1965 Oprecht .................. F16C 17/02
384/278

(Continued)

FOREIGN PATENT DOCUMENTS

CN 102200136 A 9/2011
CN 104061175 A 9/2014
(Continued)

OTHER PUBLICATIONS

International Search Report for Application No. PCT/EP2018/055802 dated Jun. 8, 2018 (3 pages).

*Primary Examiner* — Juan G Flores
(74) *Attorney, Agent, or Firm* — Michael Best & Friedrich LLP

(57) ABSTRACT

The bearing arrangement includes a one-piece gas bearing sleeve (32) configured to rotatably support the drive shaft (4) and made in molybdenum or in a molybdenum alloy, the one-piece gas bearing sleeve (32) including a radial bearing surface (33) configured to Surround the drive shaft (4).

16 Claims, 5 Drawing Sheets

(51) Int. Cl.
*F16C 3/02* (2006.01)
*F16C 17/02* (2006.01)
*F16C 33/12* (2006.01)
*F04D 29/057* (2006.01)

(52) U.S. Cl.
CPC ............... *F16C 3/02* (2013.01); *F16C 17/02* (2013.01); *F16C 33/121* (2013.01); *F05D 2300/131* (2013.01); *F16C 2204/46* (2013.01); *F16C 2360/44* (2013.01)

(56) References Cited

U.S. PATENT DOCUMENTS

| | | | | |
|---|---|---|---|---|
| 3,809,443 | A | * | 5/1974 | Cherubim ............ F16C 17/042 384/106 |
| 9,689,422 | B2 | * | 6/2017 | Yoshino .................. F02C 6/12 |
| 10,069,154 | B2 | * | 9/2018 | Metz ................... F04D 25/0606 |
| 2011/0243762 | A1 | | 10/2011 | Daikoku et al. |
| 2016/0186799 | A1 | * | 6/2016 | Yoshino .................. F01D 25/22 384/105 |

FOREIGN PATENT DOCUMENTS

| | | |
|---|---|---|
| CN | 104912838 A | 9/2015 |
| DE | 19617387 | 11/1997 |
| GB | 705067 | 3/1954 |
| JP | S63150756 A | 6/1988 |
| JP | H0271112 A | 3/1990 |
| JP | H03272317 A | 12/1991 |
| JP | H03277807 A | 12/1991 |
| JP | H11166530 A | 6/1999 |
| JP | 3272317 B2 | 4/2002 |
| JP | 3277807 B2 | 4/2002 |
| JP | 2003272317 A | 9/2003 |
| JP | 2003277807 A | 10/2003 |
| WO | 2016156757 | 10/2016 |

* cited by examiner

BEARING ARRANGEMENT FOR A DRIVE SHAFT OF A TURBO-MACHINE, AND A TURBO-MACHINE INCLUDING SUCH A BEARING ARRANGEMENT

FIELD OF THE INVENTION

The present invention relates to a bearing arrangement for a drive shaft of a turbo-machine, and particularly of a centrifugal turbo-compressor.

BACKGROUND OF THE INVENTION

As known, a centrifugal turbo-compressor may include:
a casing,
a drive shaft rotatably arranged within the casing and extending along a longitudinal axis, the drive shaft including a radial thrust bearing member,
a first and a second compression stage configured to compress a refrigerant, the first and second compression stages respectively including a first and a second impeller, the first and second impellers being connected to the drive shaft and being arranged in a back-to-back configuration,
an axial bearing arrangement configured to limit an axial movement of the drive shaft during operation, the axial bearing arrangement including:
a first axial bearing plate and a second axial bearing plate being parallel and each having an annular disc shape, the first axial bearing plate having a first surface axially facing the second axial bearing plate and a second surface opposite to the first surface of the first axial bearing plate, the second axial bearing plate having a first surface axially facing the first axial bearing plate and a second surface opposite to the first surface of the second axial bearing plate,
a spacer ring clamped between the first surfaces of the first and second axial bearing plates at radial outer portions of the first and second axial bearing plates, the spacer ring defining an axial distance between the first and second axial bearing plates, radial inner portions of the first and second axial bearing plates defining a space in which extends the radial thrust bearing member of the drive shaft, and
a radial bearing arrangement configured to rotatably support the drive shaft, the radial bearing arrangement including a bearing sleeve surrounding the drive shaft and abutting against the second surface of the second axial bearing plate.

The manufacturing of such a turbo-compressor is expensive and time consuming due particularly to the hard material, such as tungsten carbide, used to make the drive shaft, the first and second axial bearing plates and the bearing sleeve. Indeed, such a hard material is expensive, and difficult to machine due to its high surface hardness.

Further, the axial bearing arrangement and the radial bearing arrangement of such a centrifugal turbo-compressor could be respectively a gas axial bearing arrangement and a gas radial bearing arrangement. Gas bearings particularly require very small clearance to be stable while requiring enough clearance to avoid bearing seizure.

So the provision of gas bearing arrangements requires a very high level of machining accuracy to manufacture the bearing sleeve and the first and second axial bearing plates, notably regarding the dimensions and surface finishing of said parts, in order to ensure a perpendicularity between the drive shaft and the first and second axial bearing plates and therefore to confer an appropriate reliability and stability to the drive shaft and thus to the turbo-compressor. Moreover, some re-machining steps for re-machining the bearing sleeve and the first and second axial bearing plates may be required in order to ensure the above-mentioned perpendicularity.

Consequently, the provision of gas bearing arrangements further increases the manufacturing cost of a turbo-compressor.

SUMMARY OF THE INVENTION

It is an object of the present invention to provide an improved bearing arrangement, for a drive shaft of a turbo-machine, which can overcome at least partially the drawbacks encountered in conventional centrifugal turbo-compressor.

Another object of the present invention is to provide a robust, reliable and easy to manufacture and to assemble bearing arrangement and having a reduced manufacturing cost.

According to the invention such a bearing arrangement includes a radial gas bearing configured to rotatably support the drive shaft, the radial gas bearing including a gas bearing sleeve having a radial bearing surface configured to surround the drive shaft, characterized in that the gas bearing sleeve is made in molybdenum or in a molybdenum alloy.

Molybdenum is easier to machine than hard material previously used, and requires less precautions and expertise to machine the gas bearing sleeve and thus the bearing arrangement.

Consequently, the bearing arrangement according to the present invention is more reliable, and easier and less costly to manufacture than conventional bearing arrangement.

Further a main advantage of molybdenum is the fact that it has a low coefficient of thermal expansion, which is a key criterion for ensuring a high reliability for gas bearings (which require a very tight and consistent operating clearance) and for avoiding any risk of seizure during operation of the turbo-compressor. Also the high thermal conductivity of molybdenum also makes it an appropriate material for the gas bearing sleeve because said material allows to evacuate the heat produced in the bearings during the rotation of the drive shaft.

Molybdenum also has the advantage of having a high rotordynamic frequency, defined by a ratio (Young's modulus/Rho) which allows for more stability to the system at high-speed. Furthermore molybdenum has a high elastic modulus.

Molybdenum is also a more enduring material (having a better breaking strength) than ceramic or tungsten carbide which are materials currently used in the present technology.

The bearing arrangement may also include one or more of the following features, taken alone or in combination.

According to an embodiment of the invention, the bearing arrangement further includes an axial bearing surface extending substantially perpendicularly to the radial bearing surface and being configured to cooperate with a radial thrust bearing member of the drive shaft.

According to an embodiment of the invention, the gas bearing sleeve is made in a Titanium-Zirconium-Molybdenum alloy.

According to an embodiment of the invention, the molybdenum or the molybdenum alloy forming the gas bearing sleeve has a Vickers hardness of less than 500 HV.

According to an embodiment of the invention, the bearing arrangement further includes:

an axial bearing plate having an annular disc shape, the axial bearing plate having a first surface and a second surface opposite to the first surface of the axial bearing plate, and a spacer ring clamped between the first surface of the axial bearing plate and the axial bearing surface, advantageously at radial outer portions of the axial bearing plate and the axial bearing surface, the spacer ring defining an axial distance between the axial bearing plate and the axial bearing surface.

According to an embodiment of the invention, the gas bearing sleeve includes the axial bearing surface. Such a configuration of the gas bearing sleeve, and particularly the fact that it includes the radial bearing surface and the axial bearing surface, simplifies the manufacturing of the bearing arrangement and reduces the level of machining accuracy which is needed to manufacture it, while substantially reducing its manufacturing cost since molybdenum is cheaper than hard material previously used, such as tungsten carbide.

According to another embodiment of the invention, the bearing arrangement further includes an additional axial bearing plate having an annular disc shape, the additional axial bearing plate including the axial bearing surface and having an abutment surface opposite to the axial bearing surface and abutting against the radial gas bearing, and for example against the gas bearing sleeve.

According to an embodiment of the invention, the axial bearing plate is made in molybdenum or in a molybdenum alloy.

According to an embodiment of the invention, the additional axial bearing plate is made in molybdenum or in a molybdenum alloy.

According to an embodiment of the invention, the radial gas bearing includes a cooling part configured to dissipate heat from the radial gas bearing. The gas bearing sleeve may include the cooling part.

According to an embodiment of the invention, the cooling part includes a plurality of annular cooling ribs.

According to an embodiment of the invention, the annular cooling ribs are provided on an outer surface of the gas bearing sleeve.

According to an embodiment of the invention, the outer surface of the gas bearing sleeve is globally cylindrical.

According to an embodiment of the invention, a reinforcement coating is provided on at least a part of the axial bearing surface and/or on at least a part of the radial bearing surface.

According to an embodiment of the invention, the reinforcement coating is a DLC (Diamond-like carbon) reinforcement coating.

According to an embodiment of the invention, the radial gas bearing is a one-piece radial gas bearing.

According to another embodiment of the invention, the radial gas bearing further includes a bearing body configured to surround the drive shaft, the gas bearing sleeve being secured to a radial inner surface of the bearing body.

According to an embodiment of the invention, the bearing body includes the cooling part.

According to an embodiment of the invention, the abutment surface of the additional axial bearing plate abuts against the bearing body.

According to an embodiment of the invention, the radial gas bearing includes a plurality of gas bearing sleeves, for example two, axially offset. Advantageously, the gas bearing sleeves are secured to the radial inner surface of the bearing body, and are distributed along an axial length of the bearing body.

According to another embodiment of the invention, the radial gas bearing may include only one gas bearing sleeve secured to the radial inner surface of the bearing body and extending along the axial length of the bearing body.

The present invention also relates to a turbo-machine including a drive shaft having a radial thrust bearing member, and a bearing arrangement according to the invention.

According to an embodiment of the invention, the turbo-machine is a turbo-compressor, and for example a double-stage turbo-compressor.

According to an embodiment of the invention, the drive shaft includes a bearing portion surrounded by the gas bearing sleeve, the gas bearing sleeve having an inner diameter which is larger than an outer diameter of the bearing portion of the drive shaft, the bearing portion and the gas bearing sleeve defining an annular gaseous chamber when the drive shaft is rotating.

According to an embodiment of the invention, the radial thrust bearing member of the drive shaft extends into a space between radial inner portions of the axial bearing plate and the axial bearing surface, and for example between radial inner portions of the axial bearing plate and the gas bearing sleeve or between radial inner portions of the axial bearing plate and the additional axial bearing plate.

According to an embodiment of the invention, the radial thrust bearing member abuts against the axial bearing surface.

According to an embodiment of the invention, the drive shaft is made in molybdenum or in a molybdenum alloy.

According to an embodiment of the invention, the radial thrust bearing member having an annular disc shape and includes a first axial face and a second axial face opposite to the first axial face, the axial bearing surface being configured to cooperate with the second axial face of the radial thrust bearing member and the axial bearing plate being configured to cooperate with the first axial face of the radial thrust bearing member.

According to an embodiment of the invention, the turbo-machine further includes an electric motor configured to drive in rotation the drive shaft about a rotation axis, the electric motor including a stator and a rotor, the rotor being connected to a driving portion of the drive shaft.

According to an embodiment of the invention the driving portion includes an axial bore in which the rotor is received. For example, the axial bore emerges in an end face of the driving portion.

According to an embodiment of the invention, the axial bearing plate and the gas bearing sleeve are configured to limit an axial movement of the drive shaft during operation.

According to another embodiment of the invention, the axial bearing plate and the additional axial bearing plate are configured to limit an axial movement of the drive shaft during operation.

According to an embodiment of the invention, the axial bearing plate, the spacer ring and the axial bearing surface form an axial bearing, and particularly an axial gas bearing.

According to an embodiment of the invention, the turbo-machine further includes a first and a second compression stage configured to compress a refrigerant. Advantageously, the first and second compression stages respectively include a first and a second impeller, each of the first and second impellers having a front-side and a back-side, the first and second impellers being connected to the drive shaft and being arranged in a back-to-back configuration.

These and other advantages will become apparent upon reading the following description in view of the drawings attached hereto representing, as non-limiting example, an embodiment of a turbo-machine according to the invention.

BRIEF DESCRIPTION OF THE DRAWINGS

The following detailed description of one embodiment of the invention is better understood when read in conjunction with the appended drawings being understood, however, that the invention is not limited to the specific embodiment disclosed.

DETAILED DESCRIPTION OF THE INVENTION

Figure 1:
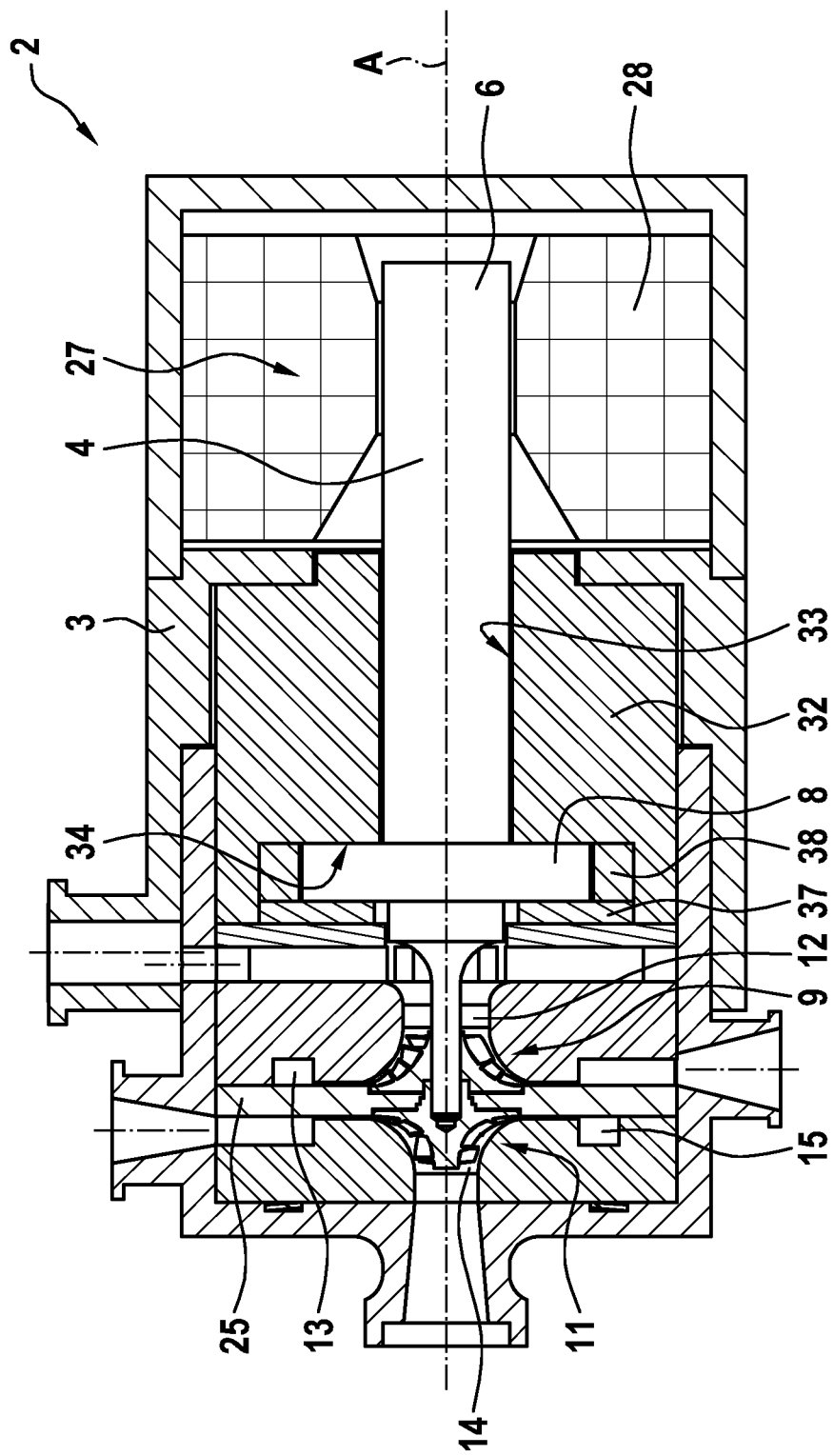
FIG. 1 is a longitudinal section view of a turbo-machine according to a first embodiment of the invention.
Figure 2:
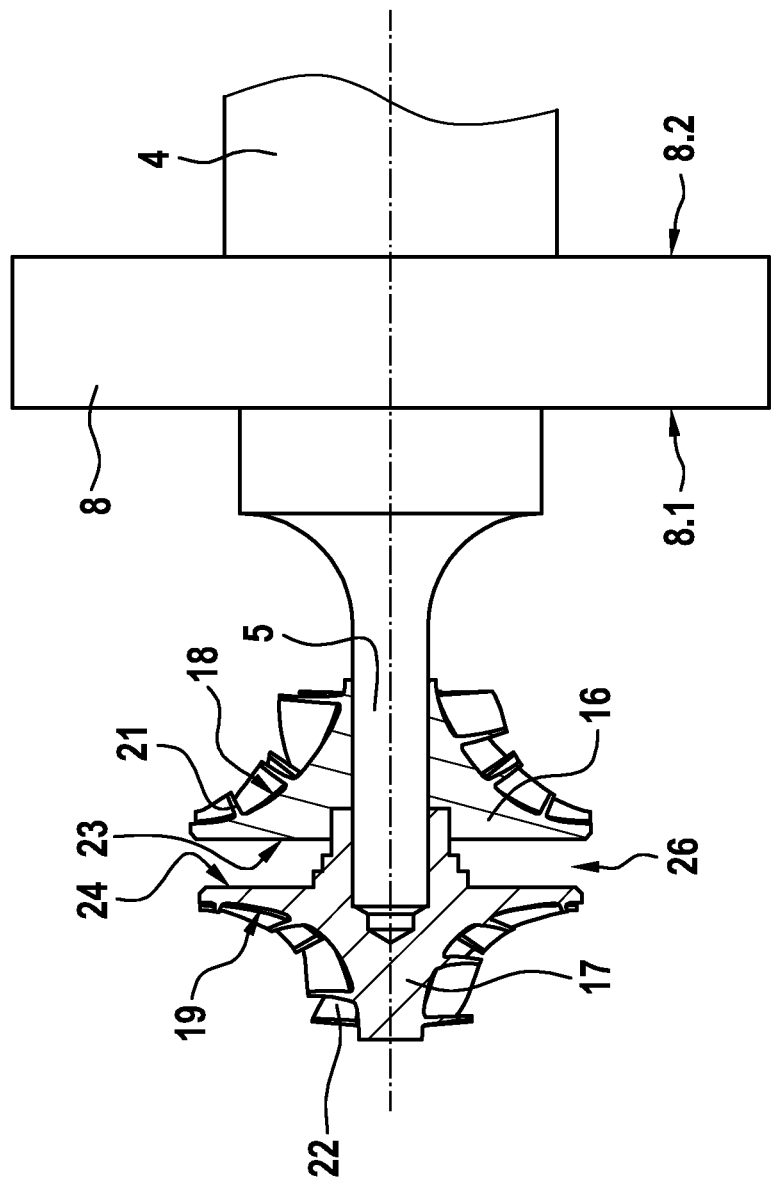
FIG. 2 is a partial longitudinal section view of the turbo-machine of FIG. 1.
Figure 3:
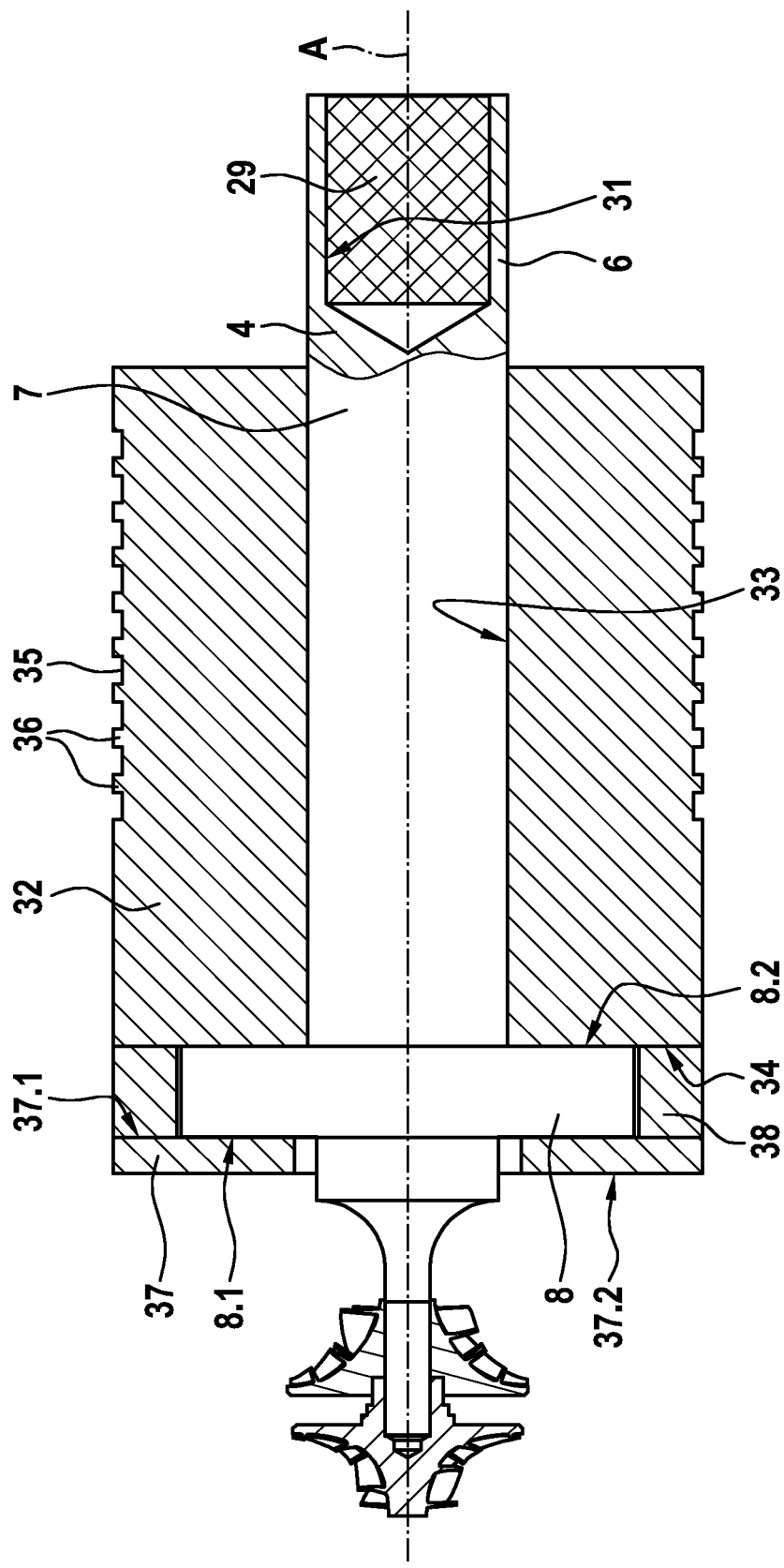
FIG. 3 is a partial longitudinal section view of a turbo-machine according to a second embodiment of the invention.

FIGS. 1 to 3 represent a turbo-machine 2, and particularly a double-stage centrifugal turbo-compressor, according to a first embodiment of the invention.

The turbo-machine 2 includes a casing 3 and a drive shaft 4 rotatably arranged within the casing 3 and extending along a longitudinal axis A. The drive shaft 4 includes an impeller portion 5, a driving portion 6 opposite to the impeller portion 5, and a bearing portion 7 arranged between the impeller portion 5 and the driving portion 6.

The drive shaft 4 further includes a radial thrust bearing member 8, also named radial flange portion, having a flat disc shape and which extends radially outwardly with respect to the bearing portion 7. The radial thrust bearing member 8 has an outer diameter larger than the outer diameter of the bearing portion 7, and includes a first axial face 8.1 and a second axial face 8.2 opposite to the first axial face 8.1. The radial thrust bearing member 8 may be integrally formed with the bearing portion 7, or may be secured to the bearing portion 7.

The turbo-machine 2 further includes a first compression stage 9 and a second compression stage 11 configured to compress a refrigerant. The first compression stage 9 includes a fluid inlet 12 and a fluid outlet 13, while the second compression stage 11 includes a fluid inlet 14 and a fluid outlet 15, the fluid outlet 13 of the first compression stage 9 being fluidly connected to the fluid inlet 14 of the second compression stage 11.

The first and second compression stages 9, 11 respectively include a first impeller 16 and a second impeller 17 which are connected to the impeller portion 5 of the drive shaft 4 and which extend coaxially with the drive shaft 4.

As better shown on FIG. 2, each of the first and second impellers 16, 17 includes a front-side 18, 19 equipped with a plurality of blades 21, 22 configured to accelerate, during rotation of the drive shaft 4, the refrigerant entering the respective one of the first and second compression stages 9, 11, and to deliver the accelerated refrigerant to a diffuser arranged at the radial outside edge of the respective one of the first and second impellers 16, 17. Each of the first and second impellers 16, 17 also includes a back-side 23, 24 extending substantially perpendicularly to the drive shaft 4.

Advantageously, the first and second impellers 16, 17 are arranged in a back-to-back configuration, so that the directions of fluid flow at the flow inlet 12, 14 of the first and second compression stages 9, 11 are opposite to each other.

According to the embodiment shown on the figures, the second impeller 17 is distinct and separated from the first impeller 17 so as to enable notably an adjustment of the axial distance between the back-sides 23, 24 of the first and second impellers 16, 17 during assembly of the turbo-machine 2. However, according to another embodiment of the invention, the first and second impellers 16, 17 may be provided on a one-piece impeller member secured to the impeller portion 5 of the drive shaft 4.

The turbo-machine 2 further includes an inter-stage sealing device 25 provided between the first and second impellers 16, 17. The inter-stage sealing device 25 may include a one-piece sealing member extending substantially perpendicularly to the drive shaft 4 and at least partially arranged within a radial annular groove 26 formed between the back-sides 23, 24 of the first and second impellers 16, 17.

The turbo-machine 2 also includes an electric motor 27 configured to drive in rotation the drive shaft 4 about the longitudinal axis A. The electric motor 27 includes a stator 28 and a rotor 29. According to the embodiment shown on the figures, the rotor 29 is connected to the driving portion 6 of the drive shaft 4, and is particularly received in an axial bore 31 provided on the driving portion 6. Advantageously, the axial bore 31 emerges in an end face of the driving portion 6.

The turbo-machine 2 further includes a bearing arrangement configured to rotatably support the drive shaft 4 and to limit an axial movement of the drive shaft 4 during operation.

The bearing arrangement notably includes a radial gas bearing 32 including a gas bearing sleeve 32.1 configured to rotatably support the drive shaft 4, and extending along the bearing portion 7 of the drive shaft 4. The gas bearing sleeve 32.1 is advantageously made in molybdenum or in a molybdenum alloy, and for example in a Titanium-Zirconium-Molybdenum alloy. According to the first embodiment of the invention, the gas bearing sleeve 32.1 is a one-piece gas bearing sleeve.

The gas bearing sleeve 32.1 includes a radial bearing surface 33 surrounding the bearing portion 7 of the drive shaft 4. Advantageously, the gas bearing sleeve 32.1 has an inner diameter which is larger than an outer diameter of the bearing portion 7 of the drive shaft 4, such that the bearing portion 7 and the gas bearing sleeve 32.1 define an annular gaseous chamber when the drive shaft 4 is rotating.

The gas bearing sleeve 32.1 further includes an axial bearing surface 34 extending substantially perpendicularly to the radial bearing surface 33, and configured to cooperate with the second axial face 8.2 of the radial thrust bearing member 8 of the drive shaft 4. Particularly, the second axial face 8.2 of the radial thrust bearing member 8 abuts against the axial bearing surface 34 of the gas bearing sleeve 32.1. Advantageously, the axial bearing surface 34 is located at an axial end face of the gas bearing sleeve 32.1 opposite to the electric motor 27.

The gas bearing sleeve 32.1 also includes a cooling part 35 configured to dissipate heat from the gas bearing sleeve 32.1. According to an embodiment of the invention, the cooling part 35 includes a plurality of annular cooling ribs 36 provided on an outer surface of the gas bearing sleeve 32.1.

According to an embodiment of the invention, a reinforcement coating, such as a DLC reinforcement coating, may be provided on at least a part of the axial bearing surface 34 and/or on at least a part of the radial bearing surface 33, in order to increase the surface hardness of the material forming the gas bearing sleeve 32.1 and thus to improve the reliability of the bearing arrangement.

Furthermore, the bearing arrangement includes an axial bearing plate 37 having an annular disc shape, and extending substantially perpendicularly to the longitudinal axis A of the drive shaft 4. The axial bearing plate 37 has a first surface 37.1 axially facing the axial bearing surface 34 and a second surface 37.2 opposite to the first surface 37.1. The axial bearing plate 37 may be made in molybdenum or in a molybdenum alloy.

Radial inner portions of the axial bearing plate 37 and the gas bearing sleeve 32.1 define a space in which extends the radial thrust bearing member 8 of the drive shaft 4. Particularly, the first surface 37.1 of the axial bearing plate 37 is configured to cooperate with the first axial face 8.1 of the radial thrust bearing member 8. According to an embodiment of the invention, an axial clearance is provided between the radial thrust bearing member 8 of the drive shaft 4 and the first surface 37.1 of the axial bearing plate 37 and the axial bearing surface 34. Such an axial clearance is for example in the range of 10 µm.

The bearing arrangement further includes a spacer ring 38 surrounding the radial thrust bearing member 8 of the drive shaft 4, and being clamped between the first surface 37.1 of the axial bearing plate 37 and the axial bearing surface 34 of the gas bearing sleeve 32.1 at radial outer portions of the axial bearing plate 37 and the gas bearing sleeve 32.1. The spacer ring 38 defines an axial distance between the axial bearing plate 37 and the axial bearing surface 34, said axial distance being slightly greater than the width of the radial thrust bearing member 8.

Figure 4:
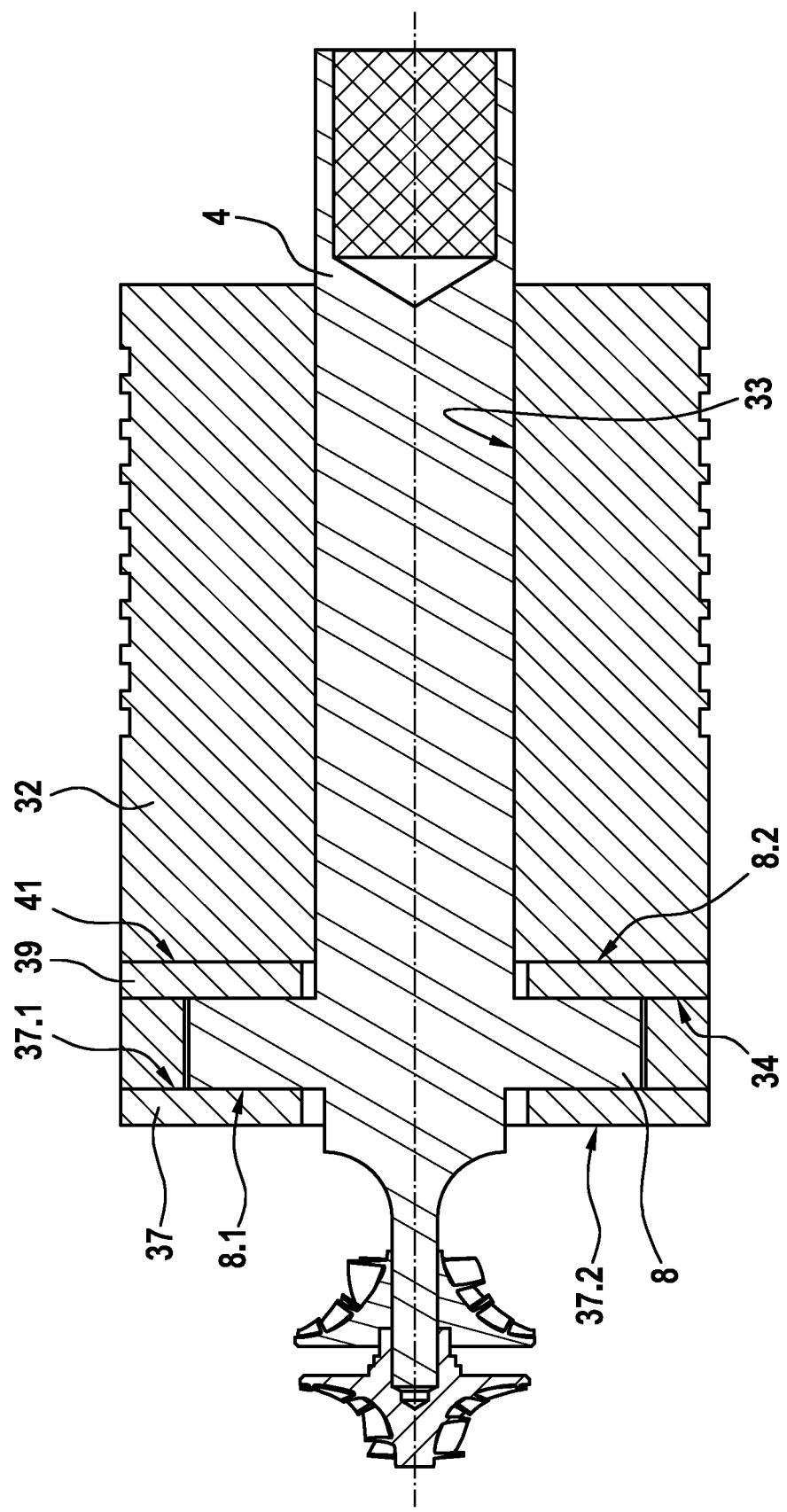
FIG. 4 is a partial longitudinal section view of a turbo-machine according to a third embodiment of the invention.

FIG. 4 represents a turbo-machine 2 according to a third embodiment of the invention which differs from the embodiment shown on FIG. 3 particularly in that it further includes an additional axial bearing plate 39 having an annular disc shape, and in that the additional axial bearing plate 39 includes the axial bearing surface 34 and has an abutment surface 41 opposite to the axial bearing surface 34 and abutting against the gas bearing sleeve 32.1. Advantageously, the additional axial bearing plate 39 is made in molybdenum or in a molybdenum alloy.

According to the third embodiment, the spacer ring 38 is clamped between the first surface 37.1 of the axial bearing plate 37 and the axial bearing surface 34 of the additional axial bearing plate 39, at radial outer portions of the axial bearing plate 37 and the additional axial bearing plate 39.

Figure 5:
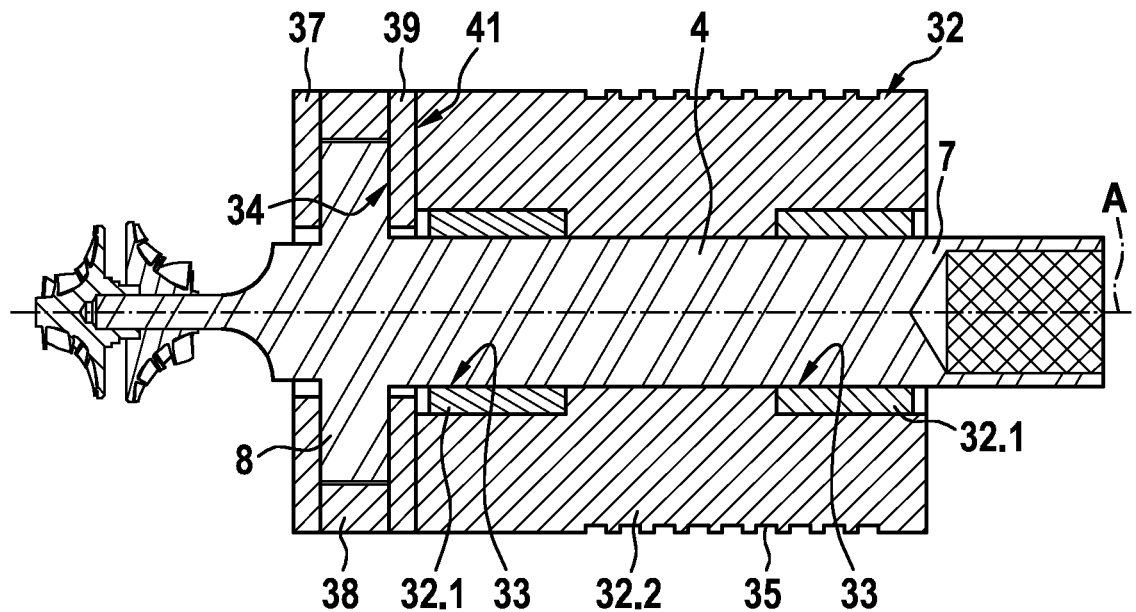
FIG. 5 is a partial longitudinal section view of a turbo-machine according to a fourth embodiment of the invention.

FIG. 5 represents a turbo-machine 2 according to a fourth embodiment of the invention which differs from the third embodiment shown on FIG. 4 particularly in that the radial gas bearing 32 includes a bearing body 32.2 configured to surround the drive shaft 4 and a plurality of gas bearing sleeves 32.1, for example two, distributed along an axial length of the bearing body and secured to a radial inner surface of the bearing body 32.2. The gas bearing sleeves 32.1 may for example be press-fitted to the bearing body 32.2.

According to said embodiment of the invention, the bearing body 32.2 includes the cooling part 35, and the abutment surface 41 of the additional axial bearing plate 39 abuts against the bearing body 32.2.

Figure 6:
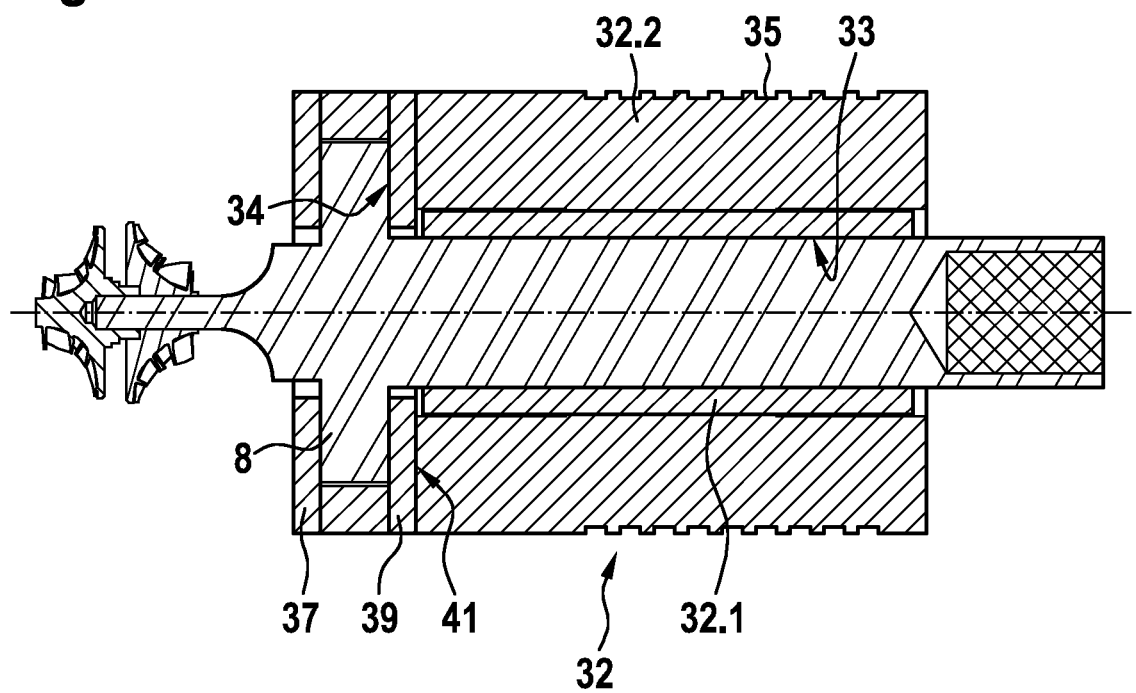
FIG. 6 is a partial longitudinal section view of a turbo-machine according to a fifth embodiment of the invention.

FIG. 6 represents a turbo-machine 2 according to a fifth embodiment of the invention which differs from the fourth embodiment shown on FIG. 5 particularly in that the radial gas bearing 32 includes only one gas bearing sleeve 32.2 secured to the radial inner surface of the bearing body 32.2 and extending substantially along the entire axial length of the bearing body 32.2.

Of course, the invention is not restricted to the embodiment described above by way of non-limiting example, but on the contrary it encompasses all embodiments thereof.

What is claimed is:

1. A bearing arrangement for a drive shaft (4) of a turbo-machine (2), the bearing arrangement including a radial gas bearing (32) configured to rotatably support the drive shaft (4), the radial gas bearing (32) including a gas bearing sleeve (32.1) having a radial bearing surface (33) configured to surround the drive shaft (4), characterized in that the gas bearing sleeve (32.1) is made of molybdenum or of a molybdenum alloy,
  wherein the radial gas bearing (32) includes a cooling part (35) configured to dissipate heat from the radial gas bearing (32), and
  wherein the bearing arrangement further includes:
    an axial bearing surface (34) extending substantially perpendicularly to the radial bearing surface (33) and being configured to cooperate with a radial thrust bearing member (8) of the drive shaft (4), and
    an axial bearing plate (39) having an annular disc shape, the axial bearing plate (39) including the axial bearing surface (34) and having an abutment surface (41) opposite to the axial bearing surface (34) and abutting against the radial gas bearing (32).

2. The bearing arrangement according to claim 1, further including:
  a second axial bearing plate (37) having an annular disc shape, the axial bearing plate (37) having a first surface (37.1) and a second surface (37.2) opposite to the first surface (37.1) of the second axial bearing plate (37), and
  a spacer ring (38) clamped between the first surface (37.1) of the second axial bearing plate (37) and the axial bearing surface (34), the spacer ring (38) defining an axial distance between the second axial bearing plate (37) and the axial bearing surface (34).

3. The bearing arrangement according to claim 2, wherein the second axial bearing plate (37) is made of molybdenum or of a molybdenum alloy.

4. The bearing arrangement according to claim 1, wherein a reinforcement coating is provided on at least a part of the axial bearing surface (34) and/or on at least a part of the radial bearing surface (33).

5. The bearing arrangement according to claim 1, wherein the radial gas bearing (32) further includes a bearing body (32.2) configured to surround the drive shaft (4), the gas bearing sleeve (32.1) being secured to a radial inner surface of the bearing body (32.2).

6. The bearing arrangement according to claim 1, wherein the radial gas bearing (32) includes a plurality of gas bearing sleeves (32.1) axially offset.

7. The bearing arrangement according to claim 1, wherein the radial gas bearing (32) is generally cylindrical and includes a longitudinal axis (A) extending along a centerline of the generally cylindrical radial gas bearing (32), and
  wherein a plurality of annular cooling ribs (36) are spaced apart on an outer circumference of the radial gas bearing (32) along the longitudinal axis (A).

8. The bearing arrangement according to claim 7, wherein the radial gas bearing (32) includes a first end and a second end opposite the first end along the longitudinal axis (A), wherein the axial bearing surface (34) is closer to the first end than the second end, and wherein the plurality of annular cooling ribs (36) extend along a portion of the outer circumference of the radial gas bearing (32) that is closer to the second end than the first end.

9. The bearing arrangement according to claim 8, wherein the axial bearing surface (34) is formed by the first end of the radial gas bearing (32).

10. The bearing arrangement according to claim 1, wherein the cooling part (35) has a plurality of annular cooling ribs (36) on an outer circumference of the radial gas bearing (32).

11. A turbo-machine (2) including a drive shaft (4) having a radial thrust bearing member (8), and a bearing arrangement according to claim 1.

12. The turbo-machine (2) according to claim 11, wherein the drive shaft (4) includes a bearing portion (7) surrounded by the gas bearing sleeve (32.1), the gas bearing sleeve (32.1) having an inner diameter which is larger than an outer diameter of the bearing portion (7) of the drive shaft (4), the bearing portion (7) and the gas bearing sleeve (32.1) defining an annular gaseous chamber when the drive shaft (4) is rotating.

13. The turbo-machine (2) according to claim 11, wherein the drive shaft (4) is made of molybdenum or of a molybdenum alloy.

14. A bearing arrangement for a drive shaft (4) of a turbo-machine (2), the bearing arrangement including a radial gas bearing (32) configured to rotatably support the drive shaft (4), the radial gas bearing (32) including a gas bearing sleeve (32.1) having a radial bearing surface (33) configured to surround the drive shaft (4), characterized in that the gas bearing sleeve (32.1) is made of molybdenum or of a molybdenum alloy, wherein the radial gas bearing (32) includes a cooling part (35) having a plurality of annular cooling ribs (36) on an outer circumference of the radial gas bearing (32), the plurality of annular cooling ribs (36) configured to dissipate heat from the radial gas bearing (32), wherein an axial bearing plate (39) having an annular disc shape forms an axial bearing surface (34), and wherein the axial bearing plate (39) includes an abutment surface (41) opposite to the axial bearing surface (34), the abutment surface (41) abutting against a first end of the radial gas bearing (32).

15. The bearing arrangement according to claim 14, wherein the radial gas bearing (32) is generally cylindrical and includes a longitudinal axis (A) extending along a centerline of the generally cylindrical radial gas bearing (32), and wherein the plurality of annular cooling ribs (36) are spaced apart on the outer circumference of the radial gas bearing (32) along the longitudinal axis (A).

16. The bearing arrangement according to claim 15, wherein the radial gas bearing (32) includes the first end and a second end opposite the first end along the longitudinal axis (A), wherein the axial bearing surface (34) extends substantially perpendicularly to the radial bearing surface (33) and is configured to cooperate with a radial thrust bearing member (8) of the drive shaft (4), wherein the axial bearing surface (34) is closer to the first end than the second end, and wherein the plurality of annular cooling ribs (36) extend along a portion of the outer circumference of the radial gas bearing (32) that is closer to the second end than the first end.

\* \* \* \* \*